United States Patent [19]
Weder

[11] Patent Number: 5,910,051
[45] Date of Patent: *Jun. 8, 1999

[54] SLEEVE HAVING A DETACHABLE PORTION FORMING A SKIRT AND METHODS

[75] Inventor: Donald E. Weder, Highland, Ill.

[73] Assignee: Southpac Trust International, Inc.

[ * ] Notice: This patent is subject to a terminal disclaimer.

[21] Appl. No.: 09/022,958

[22] Filed: Feb. 12, 1998

Related U.S. Application Data

[63] Continuation of application No. 08/788,616, Jan. 27, 1997, Pat. No. 5,749,171, which is a continuation-in-part of application No. 08/237,078, May 3, 1994, Pat. No. 5,625,979, which is a continuation-in-part of application No. 08/220,852, Mar. 31, 1994, Pat. No. 5,572,851.

[51] Int. Cl.$^6$ .................................................. A01G 9/02
[52] U.S. Cl. ................................................................ 47/72
[58] Field of Search .................................. 47/72; 53/397, 53/410, 461

[56] References Cited

U.S. PATENT DOCUMENTS

| | | | |
|---|---|---|---|
| Re. 21,065 | 5/1939 | Copeman | 93/2 |
| D. 279,279 | 6/1985 | Wagner | D11/143 |
| D. 301,991 | 7/1989 | Van Sant | D11/149 |

FOREIGN PATENT DOCUMENTS

| | | | |
|---|---|---|---|
| 4231978 | 6/1979 | Australia | 264/660 |
| 0050990 | 5/1982 | European Pat. Off. | 139/53 |
| 2036163 | 12/1970 | France | 112/34 |
| 2272914 | 12/1975 | France | 324/100 |
| 2489126 | 3/1982 | France | 330/81 |
| 2610604 | 8/1988 | France | 116/319 |
| 345464 | 12/1921 | Germany | 29/4 |
| 513971 | 11/1930 | Germany | 423/126 |
| 1166692 | 3/1964 | Germany . | |
| 3911847 | 10/1990 | Germany | 47/72 |
| 542958 | 2/1993 | Japan | 12/37 |
| 560532 | 4/1975 | Switzerland | 126/318 |
| 1204647 | 9/1970 | United Kingdom | 201/35 |
| 2074542 | 11/1981 | United Kingdom | D26/152 |
| 2128083 | 4/1984 | United Kingdom . | |
| 2252708 | 8/1992 | United Kingdom . | |
| 9315979 | 8/1993 | WIPO . | |

OTHER PUBLICATIONS

Speed Cover Brochure, "The Simple Solution For Those Peak Volume Periods", Highland Supply Corporation, ©1989.
"Speed Sheets and Speed Rolls" Brochure, Highland Supply Corporation, ©1990.
"Color Them Happy with Highlander Products" ©1992.
"Costa Keeps the Christmas Spirit", Supermarket Floral, Sep. 15, 1992.
"Super Seller", Supermarket Floral, Sep. 15, 1992.
"Halloween", Link Magazine, Sep. 1992, 2 pages.
"Now More Than Ever", Supermarket Floral, Sep. 15, 1992.
Le Plant Sac Advertisement, published prior to Sep. 26, 1987.
"A World of Cut Flower and Pot Plant Packaging", Brochure, Klerk's Plastic Products Manufacturing, Inc., Date unknown, 6 pages.
Chantler & Chantler brochure showing Zipper Sleeve™ and Florasheet®, Date unknown, 2 pages.
"Foil Jackets" brochure, Custom Medallion, Inc., Date Unknown, 2 pages.

*Primary Examiner*—Michael J. Carone
*Assistant Examiner*—Judith A. Nelson
*Attorney, Agent, or Firm*—Dunlap, Codding & Rodgers, P.C.

[57] ABSTRACT

A plant packaging system comprising a combination of a protective sleeve portion and a decorative cover portion having a base and skirt for packaging a potted plant. The protective sleeve can be detached from the decorative portion of the package system once the protective function of the sleeve has been completed. The sleeve has one or a plurality of horizontally positioned expansion elements for allowing the skirt portion to extend angularly from the base when the upper sleeve portion is detached.

30 Claims, 2 Drawing Sheets

U.S. PATENT DOCUMENTS

| | | | |
|---|---|---|---|
| D. 335,105 | 4/1993 | Ottenwalder et al. | D11/164 |
| D. 368,025 | 3/1996 | Sekerak et al. | D9/305 |
| 524,219 | 8/1894 | Schmidt | 229/89 |
| 732,889 | 7/1903 | Paver | 229/92 |
| 950,785 | 3/1910 | Pene | 229/90 |
| 1,063,154 | 5/1913 | Bergen | 229/89 |
| 1,446,563 | 2/1923 | Hughes | 47/72 |
| 1,520,647 | 12/1924 | Hennigan | 47/72 |
| 1,525,015 | 2/1925 | Weeks | 53/449 |
| 1,610,652 | 12/1926 | Bouchard | 47/72 |
| 1,697,751 | 1/1929 | Blake | 229/87 |
| 1,863,216 | 6/1932 | Wordingham | 206/284 |
| 1,978,631 | 10/1934 | Herrlinger | 91/68 |
| 2,048,123 | 7/1936 | Howard | 229/87 |
| 2,170,147 | 8/1939 | Lane | 206/56 |
| 2,278,673 | 4/1942 | Savada et al. | 154/43 |
| 2,302,259 | 11/1942 | Rothfuss | 41/10 |
| 2,355,559 | 8/1944 | Renner | 229/8 |
| 2,371,985 | 3/1945 | Freiberg | 206/46 |
| 2,411,328 | 11/1946 | MacNab | 33/12 |
| 2,510,120 | 6/1950 | Leander | 117/122 |
| 2,529,060 | 11/1950 | Trillich | 117/68.5 |
| 2,621,142 | 12/1952 | Wetherell | 154/117 |
| 2,648,487 | 8/1953 | Linda | 229/55 |
| 2,774,187 | 12/1956 | Smithers | 47/41 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 2,989,828 | 6/1961 | Warp | 53/390 |
| 3,022,605 | 2/1962 | Reynolds | 47/58 |
| 3,094,810 | 6/1963 | Kalpin | 47/37 |
| 3,121,647 | 2/1964 | Harris et al. | 118/202 |
| 3,130,113 | 4/1964 | Silman | 161/97 |
| 3,271,922 | 9/1966 | Wallerstein et al. | 53/3 |
| 3,322,325 | 5/1967 | Bush | 229/62 |
| 3,376,666 | 4/1968 | Leonard | 47/41 |
| 3,380,646 | 4/1968 | Doyen et al. | 229/57 |
| 3,431,706 | 3/1969 | Stuck | 53/390 |
| 3,508,372 | 4/1970 | Wallerstein et al. | 53/3 |
| 3,552,059 | 1/1971 | Moore | 47/41.12 |
| 3,554,434 | 1/1971 | Anderson | 229/55 |
| 3,556,389 | 1/1971 | Gregoire | 229/53 |
| 3,557,516 | 1/1971 | Brandt | 53/14 |
| 3,620,366 | 11/1971 | Parkinson | 206/59 |
| 3,681,105 | 8/1972 | Milutin | 117/15 |
| 3,767,104 | 10/1973 | Bachman et al. | 229/7 |
| 3,793,799 | 2/1974 | Howe | 53/32 |
| 3,869,828 | 3/1975 | Matsumoto | 47/34.11 |
| 3,888,443 | 6/1975 | Flanigen | 248/152 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,091,925 | 5/1978 | Griffo et al. | 206/423 |
| 4,113,100 | 9/1978 | Soja et al. | 206/602 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,280,314 | 7/1981 | Stuck | 53/241 |
| 4,297,811 | 11/1981 | Weder | 47/72 |
| 4,333,267 | 6/1982 | Witte | 47/84 |
| 4,347,686 | 9/1982 | Wood | 47/73 |
| 4,380,564 | 4/1983 | Cancio et al. | 428/167 |
| 4,400,910 | 8/1983 | Koudstall et al. | 47/84 |
| 4,413,725 | 11/1983 | Bruno et al. | 206/45.33 |
| 4,546,875 | 10/1985 | Zweber | 206/0.82 |
| 4,621,733 | 11/1986 | Harris | 206/423 |
| 4,640,079 | 2/1987 | Stuck | 53/390 |
| 4,733,521 | 3/1988 | Weder et al. | 53/580 |
| 4,765,464 | 8/1988 | Ristvedt | 206/0.82 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,835,834 | 6/1989 | Weder | 29/525 |
| 4,941,572 | 7/1990 | Harris | 206/423 |
| 4,980,209 | 12/1990 | Hill | 428/34.1 |
| 5,073,161 | 12/1991 | Weder et al. | 493/154 |
| 5,105,599 | 4/1992 | Weder | 53/399 |
| 5,111,638 | 5/1992 | Weder | 53/397 |
| 5,120,382 | 6/1992 | Weder | 156/212 |
| 5,152,100 | 10/1992 | Weder et al. | 47/72 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,249,407 | 10/1993 | Stuck | 53/399 |
| 5,259,106 | 11/1993 | Weder et al. | 29/469.5 |
| 5,307,606 | 5/1994 | Weder | 53/410 |
| 5,315,785 | 5/1994 | Avôt et al. | 47/72 |
| 5,353,575 | 10/1994 | Stepanek | 53/461 |
| 5,361,482 | 11/1994 | Weder et al. | 29/469 |
| 5,388,695 | 2/1995 | Gilbert | 206/423 |
| 5,493,809 | 2/1996 | Weder et al. | 47/72 |
| 5,496,251 | 3/1996 | Cheng | 493/224 |
| 5,496,252 | 3/1996 | Gilbert | 493/224 |
| 5,509,188 | 4/1996 | Weder et al. | 29/469.5 |
| 5,647,168 | 7/1997 | Gilbert | 47/72 |

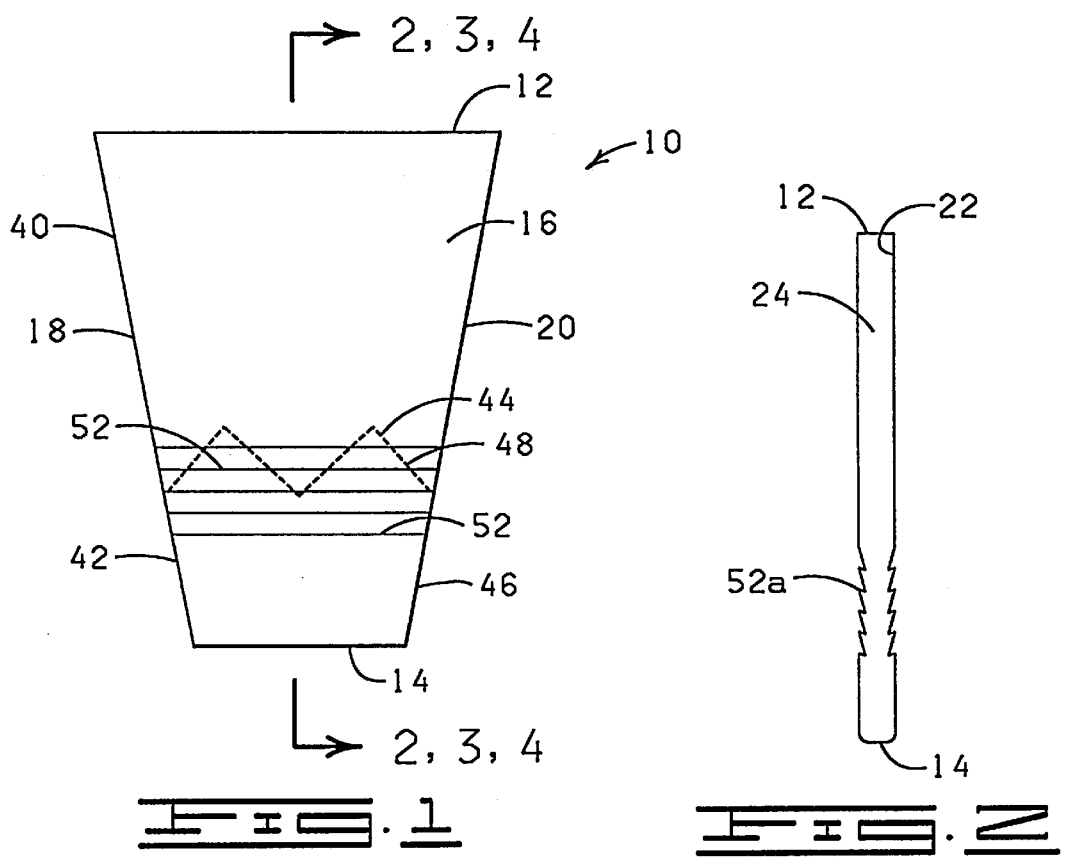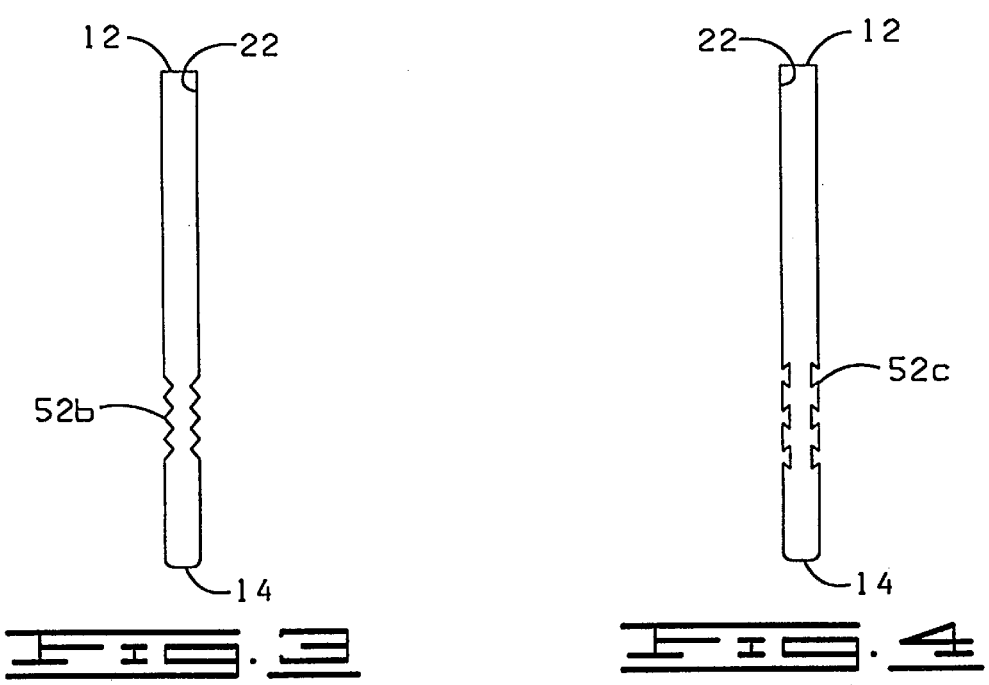

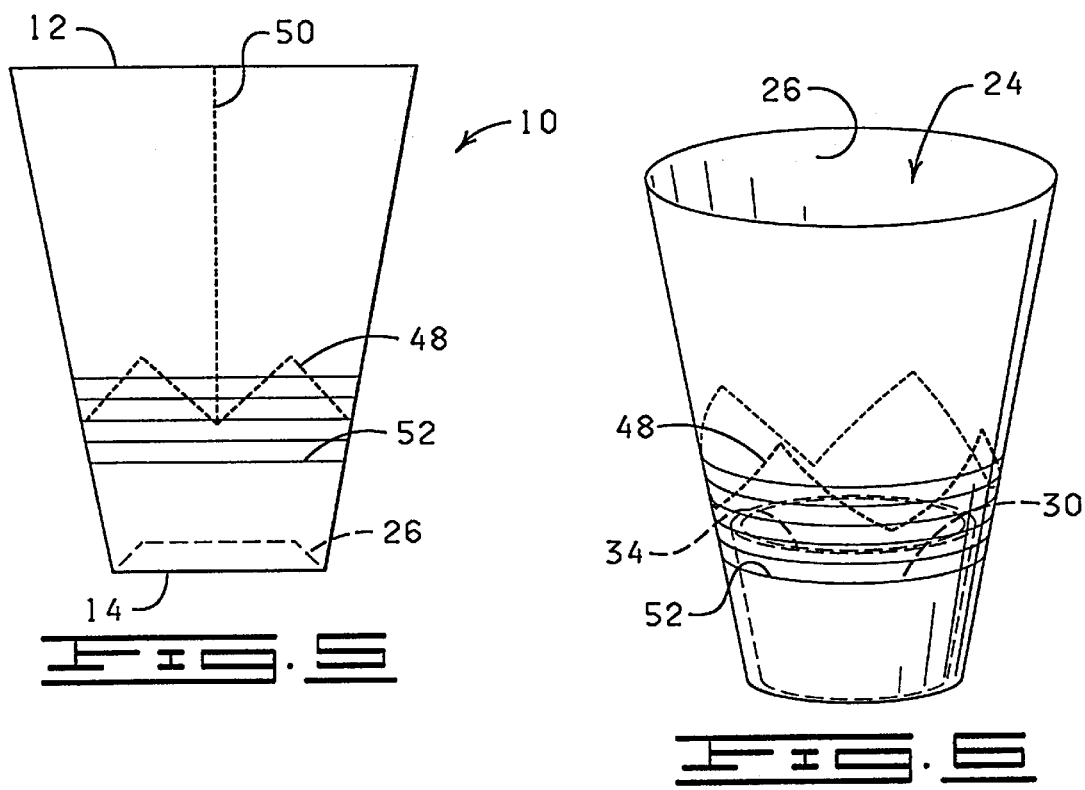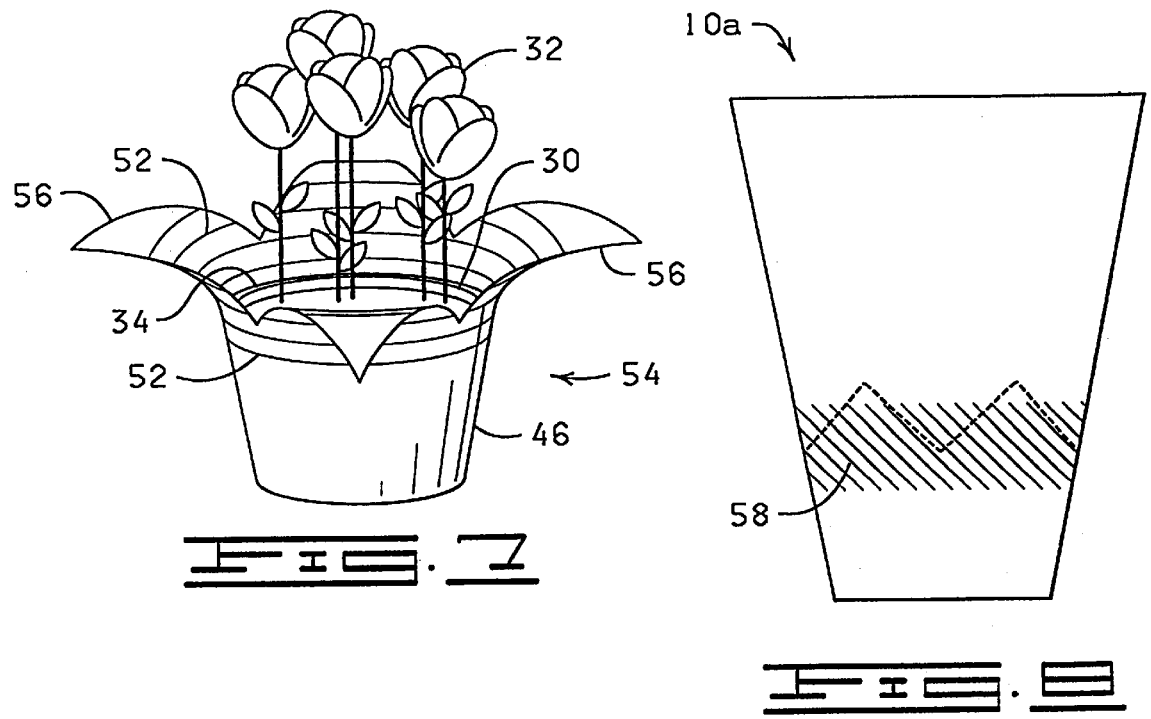

5,910,051

SLEEVE HAVING A DETACHABLE PORTION FORMING A SKIRT AND METHODS

CROSS REFERENCE TO RELATED APPLICATIONS

The present application is a continuation of U.S. Ser. No. 08/788,616 filed Jan. 27, 1997 now U.S. Pat. No. 5,749,171, entitled "SLEEVE HAVING A DETACHABLE PORTION FORMING A SKIRT AND METHODS", which is a continuation-in-part of U.S. Ser. No. 08/237,078, filed May 3, 1994 now U.S. Pat. No. 5,625,979, entitled "SLEEVE HAVING A DETACHABLE PORTION FORMING A SKIRT AND METHODS", which is a continuation-in-part of U.S. Ser. No. 08/220,852, filed Mar. 31, 1994 now U.S. Pat. No. 5,572,851, entitled "PLANT PACKAGE HAVING A DETACHABLE SLEEVE AND METHODS".

STATEMENT REGARDING FEDERALLY SPONSORED RESEARCH OR DEVELOPMENT

Not Applicable

FIELD OF THE INVENTION

This invention generally relates to sleeves, and, more particularly, to sleeves used to wrap flower pots containing floral groupings and/or media containing floral groupings, and methods of using same.

BRIEF DESCRIPTION OF THE DRAWINGS

FIG. 1 is a side view of a sleeve having detaching means and horizontal expansion means constructed in accordance with the present invention.

FIG. 2 is a sectional view of one embodiment of the sleeve of FIG. 1.

FIG. 3 is a sectional view of another embodiment of the sleeve of FIG. 1.

FIG. 4 is a sectional view of a yet another embodiment of the sleeve of FIG. 1.

FIG. 5 is a side view of a version of the sleeve FIG. 1 with a gussetted bottom.

FIG. 6 is a perspective view of a sleeve such as the sleeve of FIG. 1 having a pot disposed therein.

FIG. 7 is a perspective view of the sleeve and pot of FIG. 6 after the upper sleeve portion has been removed.

FIG. 8 is a side view of a sleeve having diagonally oriented expansion means.

DESCRIPTION OF THE PREFERRED EMBODIMENTS

The present invention contemplates a plant packaging system comprising a combination of a protective upper sleeve portion and a lower decorative cover portion having a base and skirt for packaging a potted plant. The protective upper sleeve can be detached from the decorative portion of the package system once the protective function of the sleeve has been completed, thereby exposing the decorative cover and allowing the skirt portion to extend angularly from the base. The protective sleeve and decorative cover components may comprise a unitary construction or may comprise separate components which are attached together by various bonding materials prior to disposition of the pot therein.

More specifically, the present invention contemplates a plant cover for covering a pot means having an outer peripheral surface. The plant cover comprises (1) a base portion having a lower end, an upper end, an outer peripheral surface, and a horizontally oriented area of excess material (one or more expansion elements) for allowing extension or expansion of a portion of the base portion, and (2) an upper portion extending from the upper end of the base portion and detachable therefrom, and wherein when the upper portion is detached from the upper end of the base portion, the area of excess material expands causing portions of the base portion to extend angularly from the base. In general, the base portion is sized to substantially cover the outer peripheral surface of the pot means. The upper portion may be detachable via a detaching means such as perforations, tear strips and zippers. The plant cover may have an extended portion extending from the upper portion for serving as a handle or support device.

The expansion element is integral to the base portion and optionally integral to the upper sleeve portion, for allowing expansion of a portion of the base portion into a skirt extending angularly from the base portion when the sleeve portion is detached from the upper end of the base portion. The expansion element may be one or more pleats, one or more folds each having a Z-shaped cross section, one or more accordion-type folds, or other similar types of expandable forms, and wherein the folds, creases, or pleats extend circumferentially about at least a portion of the circumference of the sleeve.

These embodiments and others of the present invention are now described in more detail below.

Shown in FIG. 1 and designated therein by the general reference numeral 10 is a flexible sleeve of unitary construction. The sleeve 10 initially comprises a flexible flat collapsed piece of material which is openable into the form of a tube or sleeve. The sleeve 10 may be tapered outwardly from the lower end toward a larger diameter at its upper end. In its flattened state the sleeve 10 has an overall trapezoidal or modified trapezoidal shape, and when opened is substantially frusto-conical to coniform. It will be appreciated, however, that the sleeve 10 may comprise variations on the aforementioned shapes or may comprise significantly altered shapes such as square or rectangular, wherein the sleeve 10 when opened has a cylindrical form, as long as the sleeve 10 functions in accordance with the present invention in the manner described herein.

The sleeve 10 has an upper end 12, a lower end 14, an outer peripheral surface 16 and in its flattened state has a first side 18 and a second side 20. The sleeve 10 has an opening at the upper end 12 and may be open at the lower end 14, or closed with a bottom at the lower end 14. The sleeve 10 also has an inner peripheral surface 22 which, when the sleeve 10 is opened, defines and encompasses an inner retaining space 24 as shown in FIGS. 2–4 and 6. When the lower end 14 of the sleeve 10 has a closed bottom a portion of the lower end 14 may be inwardly folded to form one or more gussets 26 (as shown in FIG. 5) for permitting a bottom of an object such as a potted plant to be disposed into the inner retaining space 24 of the lower end 14 of the sleeve 10.

The sleeve 10 is generally frusto-conically shaped, but the sleeve 10 may be, by way of example but not by way of limitation, cylindrical, frusto-conical, a combination of both frusto-conical and cylindrical, or any other shape, as long as the sleeve 10 functions as described herein as noted above. Further, the sleeve 10 may comprise any shape, whether geometric, non-geometric, asymmetrical and/or fanciful as long as it functions in accordance with the present invention. The sleeve 10 may also be equipped with drains or ventilation holes (not shown), or can be made from permeable or impermeable materials.

The material from which the sleeve 10 is constructed has a thickness in a range from about 0.1 mils to about 30 mils. Often, the thickness of the sleeve 10 is in a range from about 0.5 mils to about 10 mils. Preferably, the sleeve 10 has a thickness in a range from about 1.0 mil to about 5 mils. More preferably, the sleeve 10 is constructed from a material which is flexible, semi-rigid, rigid, or any combination thereof. The sleeve 10 may be constructed of a single layer of material or a plurality of layers of the same or different types of materials. Any thickness of the material may be utilized as long as the material functions in accordance with the present invention as described herein. The layers of material comprising the sleeve 10 may be connected together or laminated or may be separate layers. Such materials used to construct the sleeve 10 are described in U.S. Pat. No. 5,111,637 entitled "Method For Wrapping A Floral Grouping" issued to Weder et al., on May 12, 1992, which is hereby incorporated herein by reference. Any thickness of material may be utilized in accordance with the present invention as long as the sleeve 10 may be formed as described herein, and as long as the formed sleeve 10 may contain at least a portion of a pot or potted plant or a floral grouping, as described herein. Additionally, an insulating material such as bubble film, preferable as one of two or more layers, can be utilized in order to provide additional protection for the item, such as the floral grouping, contained therein.

In one embodiment, the sleeve 10 may be constructed from two polypropylene films. The material comprising the sleeve 10 may be connected together or laminated or may be separate layers. In an alternative embodiment, the sleeve 10 may be constructed from only one of the polypropylene films.

The sleeve 10 may also be constructed, in whole or in part, from a cling material. "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of the pot. This connecting engagement is preferably temporary in that the material may be easily removed, i.e., the cling material "clings" to the pot.

The cling material is constructed and treated if necessary, from polyethylene such as Cling Wrap made by Glad®, First Brands Corporation, Danbury, Conn. The thickness of the cling material will, in part, depend upon the size of sleeve 10 and the size of the pot in the sleeve 10, i.e., generally, a larger pot may require a thicker and therefore stronger cling material. The cling material will range in thickness from less than about 0.1 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

The sleeve 10 is constructed from any suitable material that is capable of being formed into a sleeve and wrapped about a pot 30 and a floral grouping disposed therein. Preferably, the material comprises paper (untreated or treated in any manner), cellophane, metal foil, polymer film, non-polymer film, fabric (woven or nonwoven or synthetic or natural), cardboard, fiber, cloth, burlap, or laminations or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The material comprising the sleeve 10 may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. Each of the above-named characteristics may occur alone or in combination and may be applied to the upper and/or lower surface of the material comprising the sleeve 10. Moreover, portions of the material used in constructing the sleeve 10 may vary in the combination of such characteristics. The material utilized for the sleeve 10 itself may be opaque, translucent, transparent, or partially clear or tinted transparent.

It will generally be desired to use the sleeve 10 as a covering for a pot 30 (FIGS. 6 and 7) having a plant disposed therein. The pot 30 preferably contains a plant 32. The lower end of the pot 30 is closed but may have holes for permitting water drainage. The term "pot" as used herein refers to any type of container used for holding a floral grouping or plant 32. Examples of pots, used in accordance with the present invention include, but not by way of limitation, clay pots, wooden pots, plastic pots, pots made from natural mad/or synthetic fibers, or any combination thereof. The pot 30 is adapted to receive a floral grouping 32 in the retaining space thereof. The floral grouping 32 may be disposed within the pot 30 along with a suitable growing medium described in further detail below, or other retaining medium, such as a floral foam. It will also be understood that the floral grouping 32, and any appropriate growing medium or other retaining medium, may be disposed in the sleeve 10 without a pot 30.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping 32 generally comprises a bloom or foliage portion and a stem portion. Further, the floral grouping 32 may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention, a bonding material (not shown) may be disposed on a portion of the sleeve 10 to assist in holding the sleeve 10 to the pot 30 having the floral grouping 32 therein when such a pot 30 is disposed within the sleeve 10 or to assist in closing the upper end of the sleeve 10 or adhering the sleeve 10 to the pot 30 after the pot 30 has been disposed therein. Examples of sleeves with bonding material thereon are disclosed in U.S. Ser. Nos. 08/237,078 and 08/220,852, the specifications of which are hereby specifically incorporated by reference herein in their entirety.

As shown in FIG. 1, the sleeve 10 is demarcated into an upper portion 40 and a lower portion 42. The lower portion 42 of the sleeve 10 is generally sized to contain the pot 30. The upper portion 40 of the sleeve 10 is sized to substantially surround and encompass the floral grouping 32 of the pot 30 disposed within the lower portion 42 of the sleeve 10. The sleeve 10 is demarcated into the upper portion 40 and the lower portion 42 by a detaching element 44 for enabling the detachment of the upper portion 40 of the sleeve 10 from the lower portion 42 of the sleeve 10. In the preferred version, the detaching element 44 is a plurality of generally laterally-oriented or alternatingly diagonally-oriented perforations which extend circumferentially across the outer peripheral surface 16 of the sleeve 10 from the first side 18 to the second side 20. The term "detaching element," or "detaching means" as used generally herein, means any element or means, or combination of elements, or features, such as, but not by way of limitation, perforations, tear strips, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching elements" known in the art, or any combination thereof, could be substituted therefore and/or used therewith. Other examples of perforation patterns which may be used herein are shown in FIGS. 26–31 in U.S. Pat. No. 5,493,809, the specification of which is incorporated herein by reference in its entirety.

In a preferred embodiment, the lower portion 42 of the sleeve 10 further comprises a base portion 46, and a skirt portion 48. The base portion 46 comprises that part of the lower portion 42 which, when the pot 30 is placed into the lower portion 42, has an inner peripheral surface which is substantially adjacent to and surrounds the outer peripheral surface of the pot 30. The skirt portion 48 comprises that part of the lower portion 42 which extends beyond an upper rim 34 of the pot 30 and around at least a portion of the floral grouping 32 contained within the pot 30 and which is left to freely extend at angle, inwardly or outwardly, from the base portion 46 when the upper portion of 40 the sleeve 10 is detached from the lower portion 42 of the sleeve 10 by actuation of the detaching means 44. In the intact sleeve 10, the skirt portion 48 comprises an upper peripheral edge congruent with the detaching element 44 which is connected to a lower peripheral edge, also congruent with the detaching element 44, of the upper portion 40 of the sleeve 10. In FIGS. 1, 5 and 6, the upper peripheral edge of the skirt portion 48 is congruent with a series of alternatingly diagonally-oriented lines of perforations which together form a zig-zag pattern and comprise the detaching element 44.

The upper portion 40 of the sleeve 10 may also have an additional, optional, detaching element 50 indicated as a plurality of vertical perforations for facilitating removal of the upper portion 40 and which are disposed more or less vertically therein extending between the detaching element 44 and upper end 12 of the sleeve 10. The upper portion 40 of the sleeve 10 is separable from the lower portion 42 of the sleeve 10 by tearing the upper portion 40 along both the detaching element 50 and the detaching element 44, thereby separating the upper portion 40 from the lower portion 42 of the sleeve 10. The lower portion 42 of the sleeve 10 remains disposed as the base portion 46 about the pot 30 and as the skirt portion 48 about the floral grouping 32 forming a decorative cover 54 as shown in FIG. 7 which substantially surrounds and encompasses the pot 30 and decorates the plant 32 contained therein.

It will be understood that equipment and devices for forming floral sleeves are commercially available, and are well known to a person of ordinary skill in the art.

As noted above, the sleeve 10 may have an open or closed lower end 14. When the lower end 14 is closed the lower end 14 may have one or more gussets 26 formed therein as noted above for allowing expansion of the lower end 14 when an object with a broad lower end such as a pot 30 is disposed therein. In another version of the present invention, (not shown) a strip of bonding material may be disposed on a portion of the upper portion 40 of the sleeve 10 generally in the vicinity of the upper end 12 of the sleeve 10 for allowing the upper end 12 to be sealed for enclosing the upper portion 40 of the sleeve 10 about a floral grouping 32 disposed therein.

The sleeve 10 further comprises at least one horizontal expansion element 52. The horizontal expansion element 52 is integral to at least one of the base portion 46 and the skirt portion 48 and may extend into the upper portion 40 as shown in FIG. 1. The expansion element 52 functions to allow expansion of a portion of the skirt portion 48 of the sleeve 10 into an extended skirt 56, such as the skirt 56 of the decorative cover 54 formed therefrom and shown in FIG. 7 which extends angularly from the base portion 46 when the upper portion 40 is detached from the upper end of the skirt portion 48.

Each expansion element 52 defined herein comprises one or more areas of excess material shaped in the form of a pleat, crease, or fold which extends at least partially about the circumference of the sleeve. As used herein, the term "excess material" means an amount of material which has a greater surface area than would actually be necessary to form that portion of the plant covering were that portion of the plant covering actually flattened. The expansion element 52 can expand causing portions of the skirt portion 48 to extend angularly from the base portion 46 forming a skirt 56 and a decorative cover 54 about a portion of the floral grouping 32 in the pot 30 as shown in FIG. 7.

Shown in FIG. 2 is a cross-sectional view of sleeve 10 which shows one embodiment of expansion elements designated by the reference numeral 52a which have a z-shape in cross-section. When the upper portion 40 is removed, the expansion elements 52a can expand to cause portions of the skirt portion 48 to extend angularly from the base portion 46 forming a skirt 56 as shown in FIG. 7.

Attention is now drawn to FIG. 3 and to the cross-sectional view of sleeve 10 shown therein and to the expansion element shown therein which is designated by the general reference numeral 52b. The expansion elements 52b have a pleated shape in cross-section and can expand as described above causing portions of the skirt portion 48 to extend angularly from the base portion 46 forming a skirt 56 as shown above.

Attention is now drawn to FIG. 4 and to the expansion elements shown therein which are designated by the general reference numeral 52c. Sleeve 10 of FIG. 4 is exactly the same as the sleeve 10 described above except that the sleeve of FIG. 4 has a plurality of fluted or groove-shaped expansion elements 52c. As before the expansion elements 52c of sleeve 10 can expand causing portions of the skirt portion 48 to extend angularly from the base portion 46 forming a skirt 56 in a decorative cover 54.

It will be appreciated by one of ordinary skill in the art that the shapes of the expansion elements 52a–52c described above are but several of the shapes which can be contemplated for the present invention. Other shapes which may be contemplated are gussets, fans, and "accordion-folds" to name but a few.

Further, where used herein, the term "horizontal" expansion means may also comprise expansion means which are diagonally oriented in the sleeve. FIG. 8 for example shows a sleeve 10a having expansion means 58 which are diagonally oriented.

Each of the sleeves described herein may further comprise a support extension (not shown herein but shown for example in U.S. Ser. No. 08/237,078) which extends away from a portion of the upper end of the sleeve. The support extension may have one or more apertures disposed therein for allowing the sleeve to be supported on a support assembly which may comprise, for example, a pair of wickets for shipment, storage, assembly of the sleeves, placement of a pot within the sleeve, or other functions known in the art. The support extension may have a plurality of perforations or other detaching means for allowing the support extension to be removed from the sleeve after the sleeve has been provided for use as described elsewhere herein. In another version of the invention, and applicable to any of the sleeves described above, or elsewhere herein, a sleeve has a handle for carrying the potted plant package by the sleeve. The sleeve may further comprises a detaching element comprising perforations for removing the handle at a later time.

As noted above, the protective sleeve (the upper portion 40) and decorative cover components (the base portion 42) of the present invention may comprise a unitary construction, or may comprise separately formed components which are connected together by various bonding materials prior to application of the sleeve about the pot 30.

Changes may be made in the construction and the operation of the various components, elements and assemblies described herein or in the steps or the sequence of steps of the methods described herein without departing from the spirit and scope of the invention as defined in the following claims.

What is claimed is:

1. A sleeve for covering a pot means having an outer peripheral surface, the tubular sleeve having an initially flattened condition, comprising:

a base portion having a lower end, an upper end, an outer peripheral surface, and an area of excess material comprising one or more preformed creases or folds positioned in a horizontal or diagonal orientation for allowing extension of a portion of the base portion and having an opening extending from the upper end to the lower end and wherein the area of excess material can be expanded to cause portions of the base portion to extend angularly from the base.

2. The plant cover of claim 1 wherein the base portion is further defined as being sized to substantially cover the outer peripheral surface of the pot means.

3. The plant cover of claim 1 further defined as constructed from a material having a thickness in a range of from about 0.1 mils to about 30 mils.

4. The plant cover of claim 1 further defined as constructed from a material selected from the group consisting of treated or untreated paper, cellophane, metal foil, polymer film, non-polymer film, cardboard, fiber, cloth, burlap, and laminations or combinations thereof.

5. The plant cover of claim 1 wherein the area of excess material further comprises one or a plurality of pleats, one or a plurality of folds each having a z-shaped cross section, or one or a plurality of accordion-type folds.

6. A sleeve for covering a pot means having an outer peripheral surface, the tubular sleeve having an initially flattened condition, comprising:

a base portion having a lower end, an upper end, and an outer peripheral surface and having an opening extending from the upper end to the lower end; and extension means comprising one or more preformed creases or folds positioned in a horizontal or diagonal orientation, the extension means integral to the base portion for allowing a skirt portion of the base portion to be extended as a skirt angularly from the base portion.

7. The plant cover of claim 6 wherein the base portion is further defined as being sized to substantially cover the outer peripheral surface of the pot means.

8. The plant cover of claim 6 further defined as constructed from a material having a thickness in a range of from about 0.1 mils to about 30 mils.

9. The plant cover of claim 6 further defined as constructed from a material selected from the group consisting of treated or untreated paper, cellophane, metal foil, polymer film, non-polymer film, cardboard, fiber, cloth, burlap, and laminations or combinations thereof.

10. The plant cover of claim 6 wherein the extension means further comprises one or a plurality of pleats, one or a plurality of folds each having a z-shaped cross section, or one or a plurality of accordion-type folds.

11. A sleeve for covering a pot means having an outer peripheral surface, the tubular sleeve having an initially flattened condition, comprising:

a base portion having a lower end, an upper end, an outer peripheral surface, and having an opening extending from the upper end to the lower end;

a skirt portion attached to the base portion and having an upper end and extending a distance beyond the upper end of the base portion; and means for extending the skirt integral to at least one of the skirt portion and the base portion for enabling at least a portion of the skirt portion to be extended angularly from the base portion, the means for extending comprising one or more preformed creases or folds positioned in a horizontal or diagonal orientation.

12. The plant cover of claim 11 wherein the base portion is further defined as being sized to substantially cover the outer peripheral surface of the pot means.

13. The plant cover of claim 11 further defined as constructed from a material having a thickness in a range of from about 0.1 mils to about 30 mils.

14. The plant cover of claim 11 further defined as constructed from a material selected from the group consisting of treated or untreated paper, cellophane, metal foil, polymer film, non-polymer film, cardboard, fiber, cloth, burlap, and laminations or combinations thereof.

15. The plant cover of claim 11 wherein the means for extending further comprises one or a plurality of pleats, one or a plurality of folds each having a z-shaped cross section, or one or a plurality of accordion-type folds.

16. The sleeve of claim 1 wherein the lower end is open.

17. The sleeve of claim 1 wherein the lower end is closed.

18. The sleeve of claim 17 wherein the closed lower end has a gusset therein.

19. The sleeve of claim 17 having a drain hole therein.

20. The sleeve of claim 1 having a bonding material thereon for adhering the sleeve to the pot after the pot has been disposed within the sleeve.

21. The sleeve of claim 6 wherein the lower end is open.

22. The sleeve of claim 6 wherein the lower end is closed.

23. The sleeve of claim 22 wherein the closed lower end has a gusset therein.

24. The sleeve of claim 22 having a drain hole therein.

25. The sleeve of claim 6 having a bonding material thereon for adhering the sleeve to the pot after the pot has been disposed within the sleeve.

26. The sleeve of claim 11 wherein the lower end is open.

27. The sleeve of claim 11 wherein the lower end is closed.

28. The sleeve of claim 27 wherein the closed lower end has a gusset therein.

29. The sleeve of claim 27 having a drain hole therein.

30. The sleeve of claim 11 having a bonding material thereon for adhering the sleeve to the pot after the pot has been disposed within the sleeve.

* * * * *